United States Patent
Breisch et al.

(10) Patent No.: US 12,398,736 B2
(45) Date of Patent: Aug. 26, 2025

(54) MAGNETIC FORCE COMPENSATOR FOR A PNEUMATIC POSITIONER

(71) Applicant: ABB Schweiz AG, Baden (CH)

(72) Inventors: Sebastian Breisch, Neckarsteinach (DE); Arda Tueysuez, Darmstadt (DE); Ondrej Frantisek, Heddesheim (DE)

(73) Assignee: ABB Schweiz AG, Baden (CH)

( * ) Notice: Subject to any disclaimer, the term of this patent is extended or adjusted under 35 U.S.C. 154(b) by 391 days.

(21) Appl. No.: 17/732,904

(22) Filed: Apr. 29, 2022

(65) Prior Publication Data

US 2022/0349425 A1    Nov. 3, 2022

(30) Foreign Application Priority Data

Apr. 30, 2021 (EP) ................... 21171649

(51) Int. Cl.
  *F15B 13/044* (2006.01)
  *F16K 31/08* (2006.01)

(52) U.S. Cl.
  CPC .......... *F15B 13/044* (2013.01); *F16K 31/082* (2013.01)

(58) Field of Classification Search
  CPC .................................................. F16K 31/082
  See application file for complete search history.

(56) References Cited

U.S. PATENT DOCUMENTS

| | | |
|---|---|---|
| 3,420,492 A | 1/1969 | Ray |
| 3,502,105 A | 3/1970 | Ernyei et al. |
| 3,570,806 A | 3/1971 | Sturman et al. |
| 4,630,799 A * | 12/1986 | Nolan .............. F16K 31/082 137/460 |
| 5,029,807 A * | 7/1991 | Fuchs .............. F16K 31/082 251/65 |
| 7,492,076 B2 * | 2/2009 | Heim .............. H10N 30/206 310/330 |
| 2009/0250021 A1 | 10/2009 | Zarrabi et al. |

(Continued)

FOREIGN PATENT DOCUMENTS

| | | |
|---|---|---|
| CN | 107314148 A | 11/2017 |
| CN | 108573828 A | 9/2018 |
| DE | 1814283 U | 6/1960 |

(Continued)

OTHER PUBLICATIONS

European Patent Office, Extended European Search Report in European Patent Application No. 21171649.3, 8 pp. (Oct. 18, 2021).

(Continued)

*Primary Examiner* — Eric Keasel
(74) *Attorney, Agent, or Firm* — Leydig, Voit & Mayer, Ltd.

(57) ABSTRACT

A magnetic force compensator for at least partially compensating a closing force required to shift a valve of a pneumatic positioner into a closed position using a magnetic device, the magnetic device including a permanent magnet; and a magnetic counterpart; wherein the magnetic device and the magnetic counterpart are configured to interact to create an attracting force for the at least partially compensation of the closing force; and wherein the magnetic force compensator is configured to be mechanically coupled to the valve of the pneumatic positioner.

16 Claims, 8 Drawing Sheets

(56) References Cited

U.S. PATENT DOCUMENTS

2011/0253918 A1    10/2011   Rampen et al.

FOREIGN PATENT DOCUMENTS

| EP | 1316749 A2 | 6/2003 |
|---|---|---|
| FR | 2139259 A5 | 1/1973 |
| JP | 2011-158021 A | 8/2011 |
| KR | 10-2010-0120761 A | 11/2010 |
| WO | WO 02/38948 A1 | 5/2002 |
| WO | WO 2007/128977 A2 | 11/2007 |
| WO | WO 2008/083325 A1 | 7/2008 |

OTHER PUBLICATIONS

European Patent Office, Office Action in European Patent Application No. 21171649.3, 8 pp. (Jul. 18, 2024).
The Patent Office of the People's Republic of China, Office Action in Chinese Patent Application No. 202210475309.0, 11 pp. (Aug. 15, 2024).
Lu, "Practical Valve Design Manual," 4th edition, *Mechanical Industry Press*, 37 pp. (May 2020).

\* cited by examiner

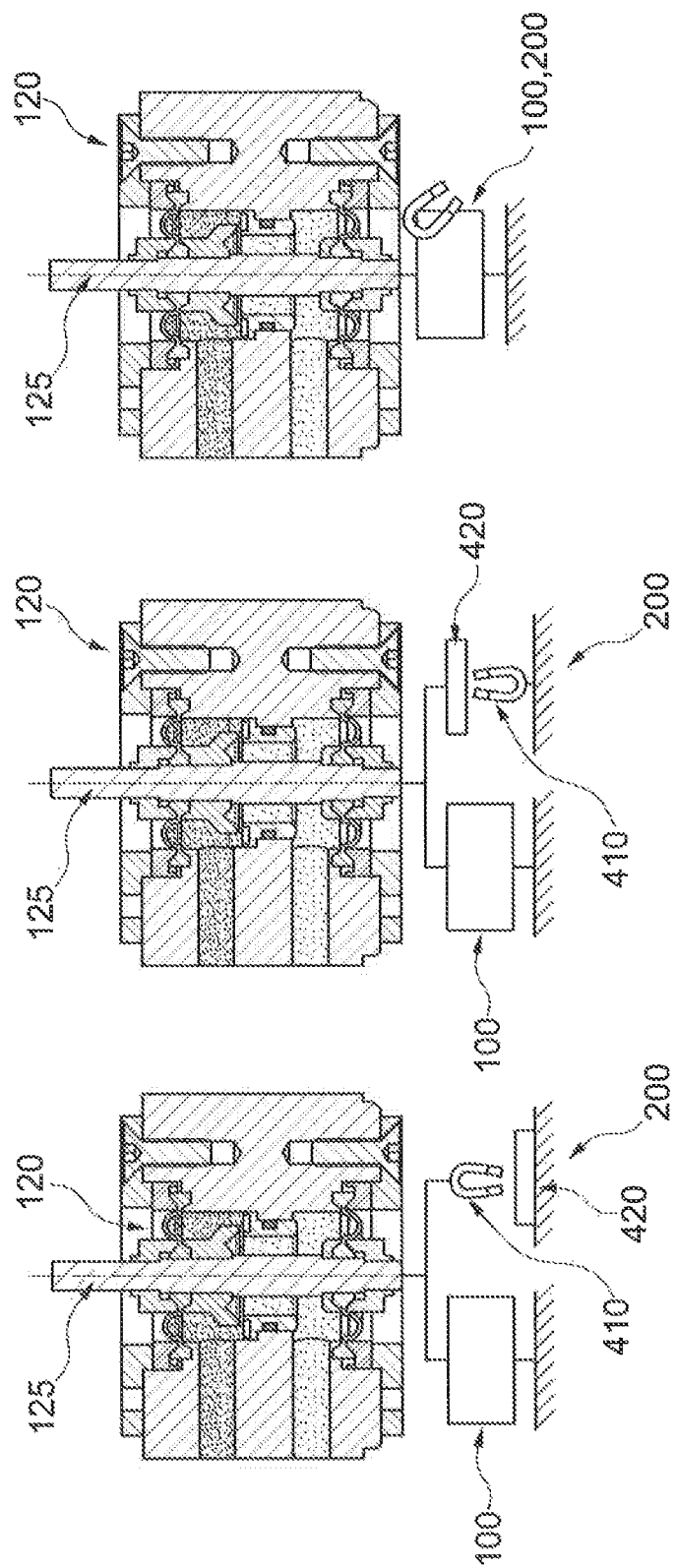

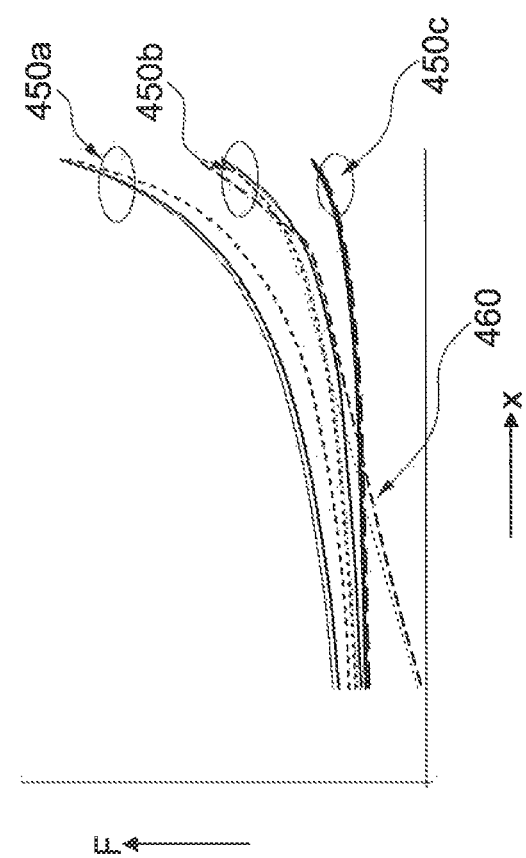
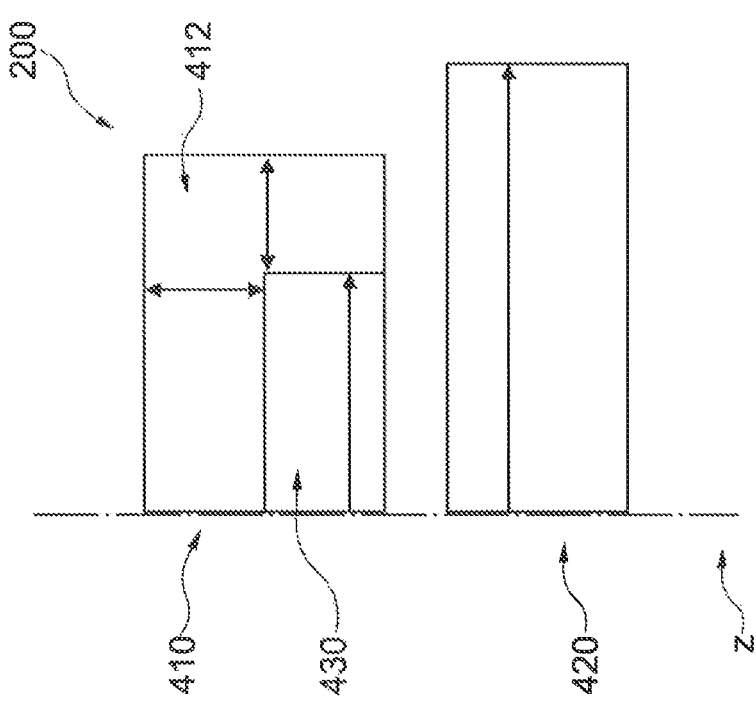
Fig. 4a
Fig. 4b

MAGNETIC FORCE COMPENSATOR FOR A PNEUMATIC POSITIONER

CROSS-REFERENCE TO RELATED APPLICATIONS

This patent application claims priority to European Patent Application No. 21171649.3, filed on Apr. 30, 2021, which is incorporated herein in its entirety by reference.

BACKGROUND OF THE INVENTION

Today more than 60% of all actuators for the process industry are based on pneumatics, which require a positioner to control the position of the actuator.

To operate such a valve positioner, a "main stage" of the valve positioner is driven by a "pilot stage." The main stage is a unit that operates the pneumatic actuator, which operates a process valve at the required pneumatic operating pressure, as e.g. 10 bar. The standard approach is to design the system, including the valve positioner, the pneumatic actuator and the process valve such that an operating point of the main stage is close to a balance of forces, leading small changes on a control pressure to provide the desired tripping of the valve. Valve positioners in general must comply with stringent requirements on low energy consumption. The unit that controls the control pressure of the valve positioner, the "pilot stage," represents a controllable part of the system. A pressure to run the pilot stage is a fraction of the pneumatic operation pressure of the pneumatic actuator and is provided by a pressure reducer.

BRIEF SUMMARY OF THE INVENTION

A valve positioner, respectively a system including valve positioners with pneumatic output, faces two contrary business demands. On the one hand, there is a demand for high pneumatic pressure to operate the pneumatic actuator; on the other hand, there are stringent requirements for a low power consumption of the overall system. For this, a conventional positioner includes several submodules. These submodules can be seen as force amplifiers. However, this state-of-the-art arrangement leads to a complex and bulky setup. In order to operate high pneumatic pressure with low, particularly electrical, power, a close to equilibrium topology is applied, in which the forces by the pneumatic pressure are balanced by e.g. compensation springs. Thus, only a small force, and correspondingly energy, is sufficient to control a position of the process valve.

This small amount of "controlled force" is conventionally also based on pneumatic pressure. Therefore, a "pressure reducer" is used, which reduces the total pneumatic pressure partly to provide low-pressure to a subsystem, which is configured to be controlled with low electrical power. This "low-pressure-subsystem" is the "pilot stage." Using other words, the pilot stage acts as a force amplifier, controlling a larger force of a pneumatic pressure by a smaller controlled force. The usage of pilot stages in general is inefficient and cost intensive. Former power requirements have led to the design of a balanced main stage and a controllable sub-unit (pilot stage) that is to control a fraction of the pneumatic pressure.

BRIEF DESCRIPTION OF THE SEVERAL VIEWS OF THE DRAWING(S)

The accompanying drawings, which are included to provide a further understanding of the disclosed embodiments and are incorporated in and constitute a part of this application.

FIGS. 3a, 3b, and 3c represent variations of valve positioners with a positioner drive and a force compensator in accordance with the disclosure.

FIGS. 4a and 4b illustrate a magnetic force compensator, and a corresponding magnetic force versus magnetic gap diagram in accordance with the disclosure.

Figure 5C:
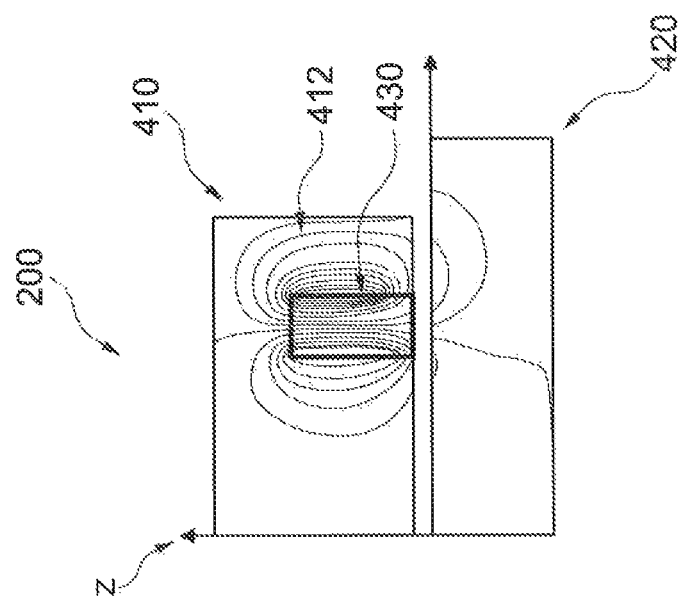
Figure 5B:
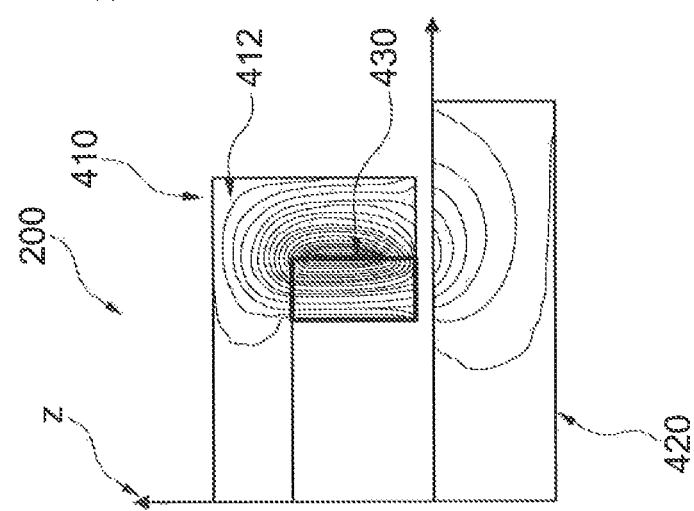
Figure 5A:
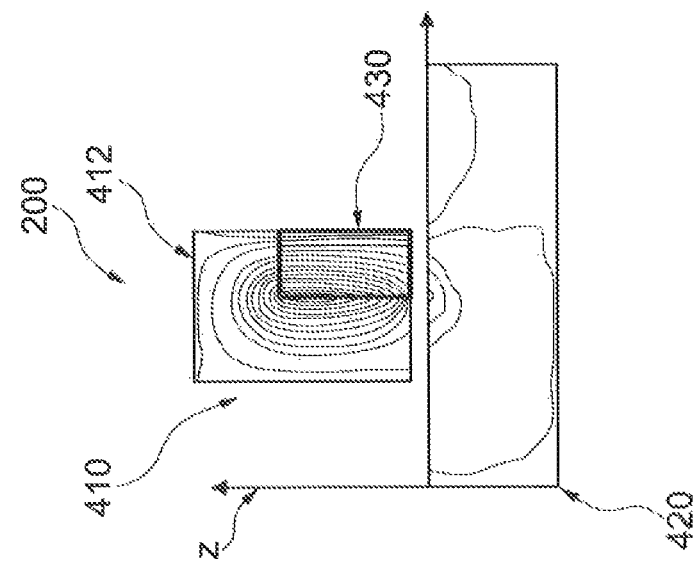
Figure 6A:
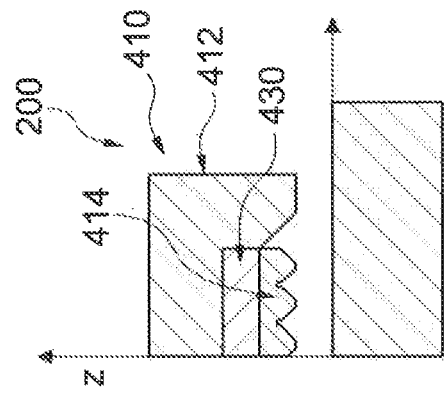
Figure 6B:
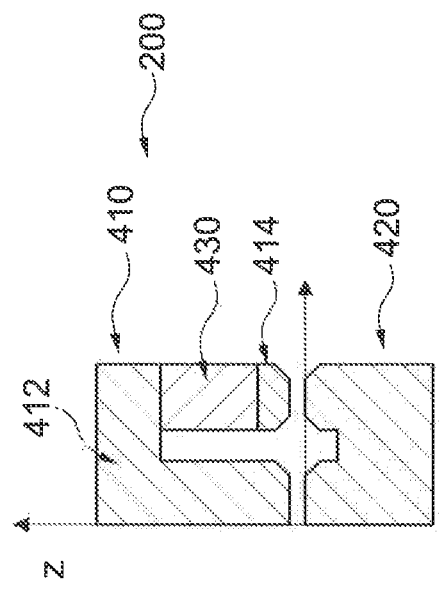
Figure 6C:
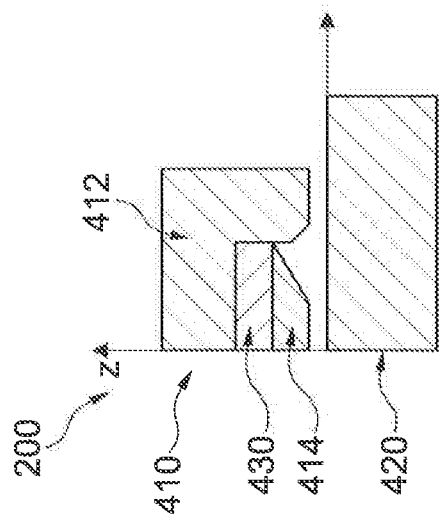
Figure 6D:
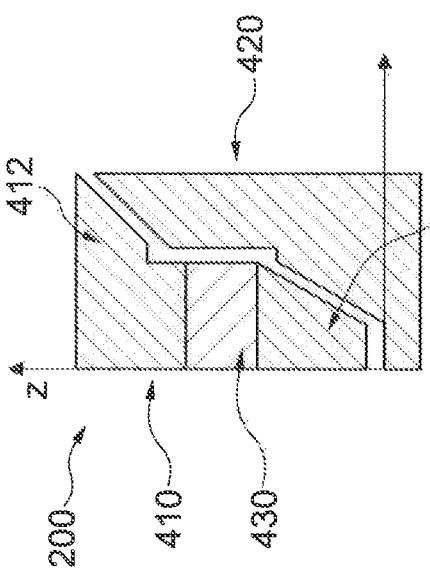

FIGS. 5a, 5b, and 5c are schematic drawings of variations of magnetic force compensators in accordance with the disclosure.

FIGS. 6a, 6b, 6c, and 6d are schematic drawings of variations of magnetic force compensators including magnetic pole faces in accordance with the disclosure.

Figure 7:
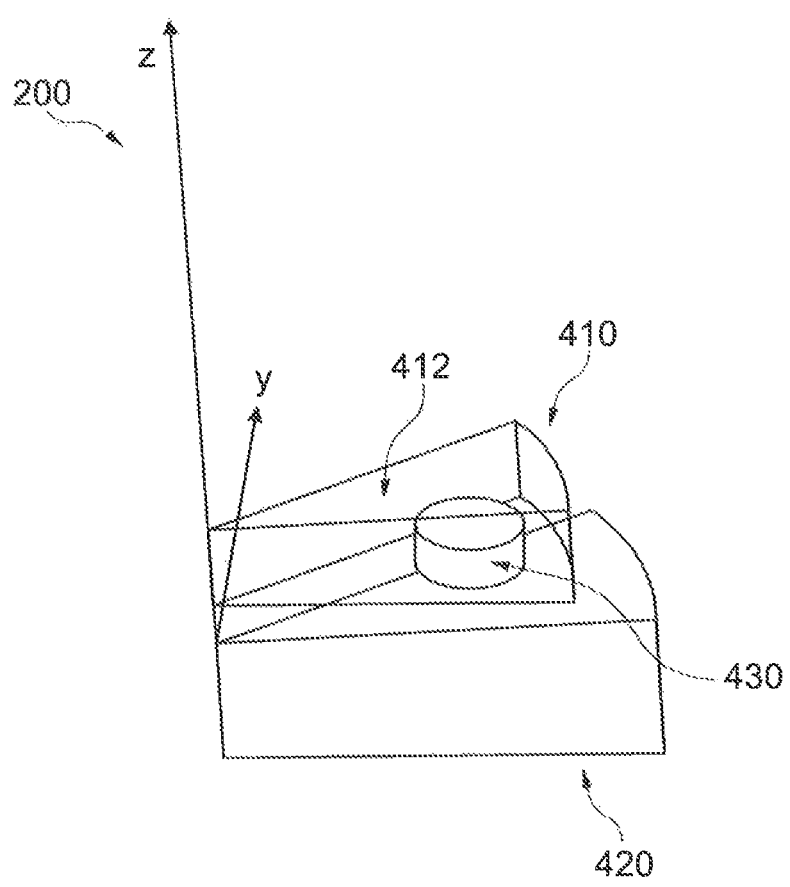

FIG. 7 is a schematic drawing of a segment of a magnetic force compensator in accordance with the disclosure.

Figure 8:
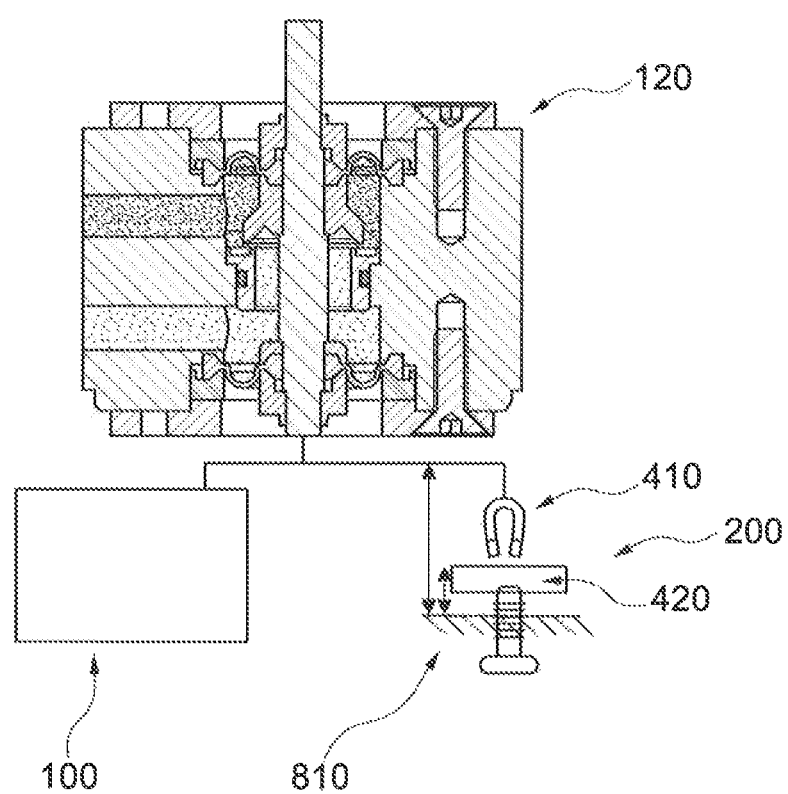

FIG. 8 illustrates a valve positioner with a positioner drive and an adjustable force compensator in accordance with the disclosure.

DETAILED DESCRIPTION OF THE INVENTION

Figure 1B:
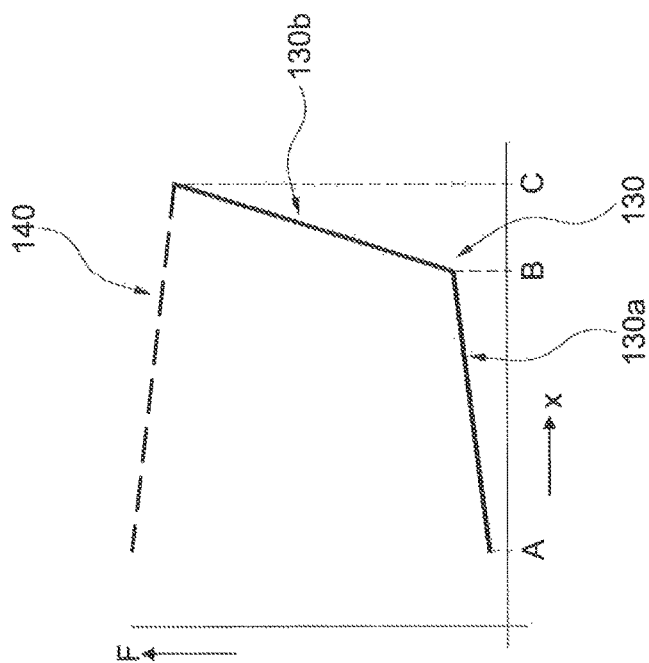
FIG. 1b illustrates a force gap diagram of a state-of-the-art valve positioner in accordance with the disclosure.
Figure 1A:
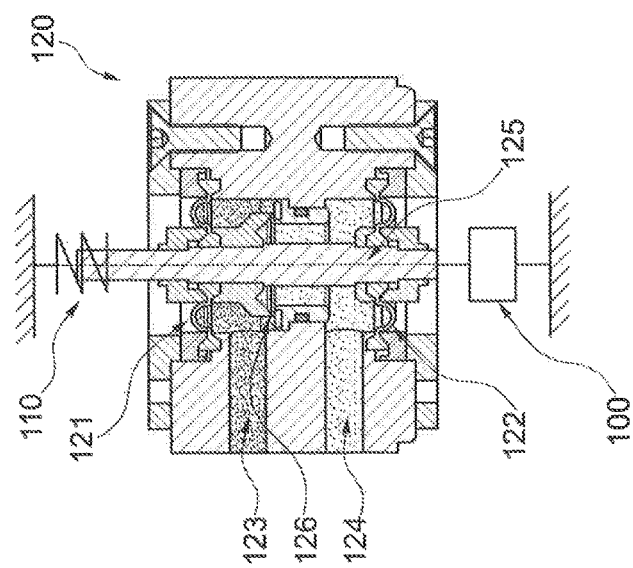
FIG. 1a represents a state-of-the-art valve positioner with pneumatic output including a reset spring in accordance with the disclosure.

FIG. 1a sketches schematically a state-of-the-art valve positioner 120 with pneumatic output mechanically coupled to a positioner drive 100, which is directly mechanically coupled to a valve 126 of the valve positioner 120, wherein the valve positioner is provided with a reset spring 110 to closed the valve 126 in case the positioner drive 100 is off and/or in a fail mode.

The state-of-the-art valve positioner with pneumatic output 120 includes a valve 126 and a plunger 125 of the valve mechanically coupled to the valve 126. A first valve compartment 123 and a second valve compartment 124 can be pneumatically coupled by the valve 126 and a first sealing diaphragm 121, which seals the first compartment 123 with respect to an outside of the valve positioner 120 with pneumatic output as well as a second sealing diaphragm 122, configured to seal the second compartment 124 of the valve positioner 120 to the outside of the valve positioner 120 with pneumatic output. The first and the second sealing diaphragms 121, 122 are mounted in a housing of the valve positioner 120 and are coupled to the plunger 220 of the valve.

A "Fail to close" functionality, or "default closed" position, of the valve positioner 120 can be required by applications of the valve positioner 120 to ensure that the valve 126 of the valve positioner 120 is closed in case of a failure. The requirement can include a functionality of the valve positioner 120 with an actuator coupled to the valve positioner 120 that a defined state is achieved for a non-electrical power status; meaning that the valve positioner 120 is closed and sealed, e.g. if the electrical power of the actuator is cut off.

This can be achieved by the reset spring 110 as shown in FIG. 1a. For operation of the valve positioner 120 a positioner drive 100 has to work against that spring 110 to operate the valve 126.

FIG. 1b shows a diagram, where a force F required to shift the valve 126 of the valve positioner 120 into an open position is plotted against a valve gap of the valve 126 of the valve positioner 120 according to a state-of-the-art valve positioner 120 as shown.

A force 140 of the reset spring 110 is also plotted against the valve gap within the diagram. It is shown by the gradient of the force 140 of the reset spring 110 that the reset spring 110, if mechanically coupled to the valve 126 of the valve positioner 120, is configured to make sure that the force F of the reset spring 110 is high enough to force the valve 126 into the closed and sealed position, if e.g. the positioner drive 100 fails.

A stem force 130, required to shift the valve 126 of the valve positioner 120, which results from a closing of the valve 126, versus valve gap curve starts with a flatter slope section 130a, when the valve gap is shifted to a closed position starting with an open position. This is because the stem force in the first section 130a is primary caused by a stiffness of the flexible seals of the valve positioner 120.

When the valve gap starts to close, the force F to drive the valve seat into a sealing position increases steeply, as shown in a steeper second segment 130b of the curve 130. Consequently, the positioner drive 100 must provide a high force in this steeper segment 130b.

As becomes clear from the diagram, the spring force, caused by the reset spring 110, is higher than the stem force 130 such that the reset spring 110 can drive the valve 126 into a sealed position. To open and/or keep a position of the valve 126 of the valve positioner 120 the positioner drive 100 can be configured to provide a force, which corresponds to the difference between the force of the reset spring 140 and the stem force 130. It has to be noted that the diagram does not take into account the direction of the forces, but plots the absolute values of the forces. Note that the force of the reset spring decreases towards the sealed position of the valve 126, which is the end of the spring-driven motion.

The stem force must be applied to hold the moving shaft at a given position, to maintain a certain valve gap opening. This force must be provided by the positioner drive 100.

Figure 2B:
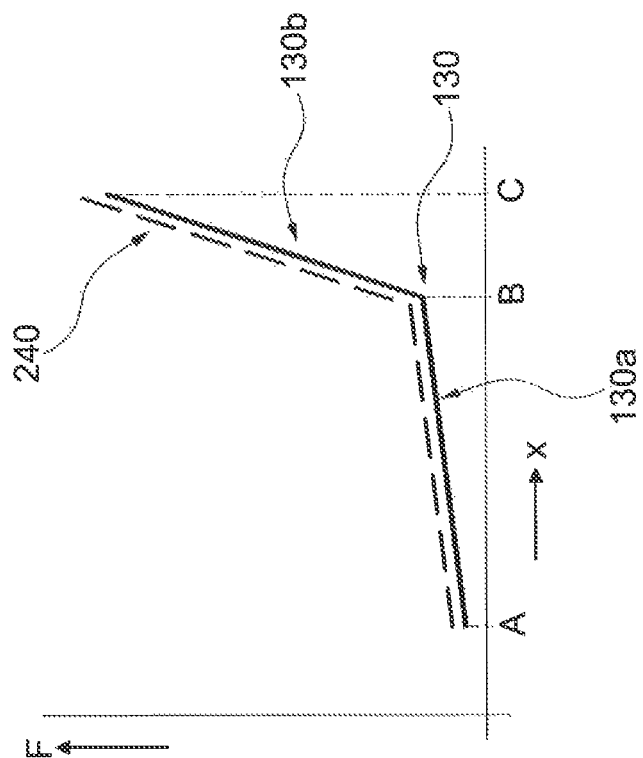
FIG. 2b is a force gap diagram of a valve positioner including a force compensator in accordance with the disclosure.
Figure 2A:
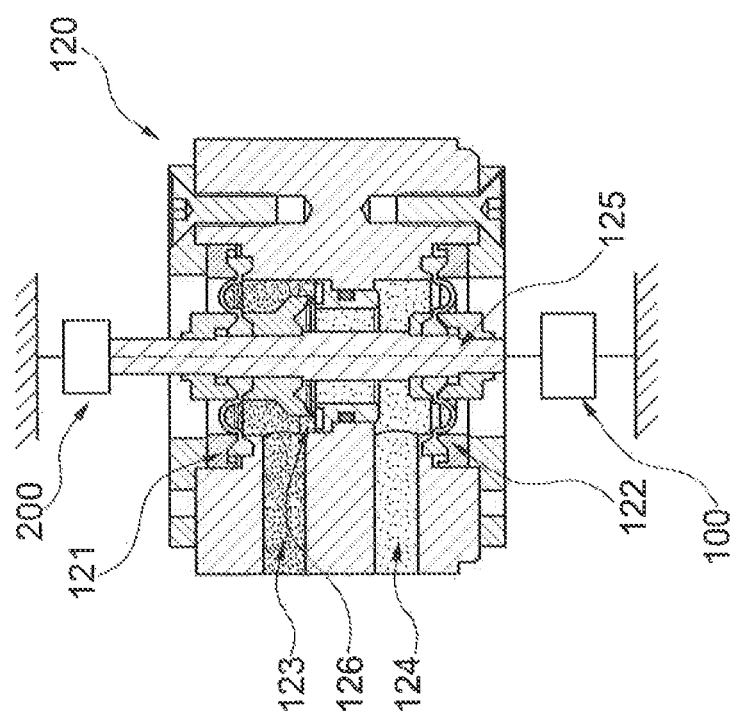
FIG. 2a shows a valve positioner including a force compensator in accordance with the disclosure.

FIG. 2a sketches schematically a valve positioner 120 with pneumatic output, which is controlled by a positioner drive 100 and mechanically coupled to a force compensator 200.

The force compensator 200 is sketched as an ideal force compensator 200, whose force would be just high enough to drive the valve 126 into the sealed position and/or for compensation the stem force, corresponding to the stem force valve gap relationship 130, such that the force required of the positioner drive 100 to control the valve positioner 120 can be minimized.

FIG. 2b shows a diagram, where a required stem force F curve 130 to shift a valve 126 of the valve positioner 120 into an open position is plotted against a valve gap of the valve 126 of the valve positioner 120 according to a state-of-the-art valve positioner 120 as shown corresponding to the diagram of FIG. 1b.

A force curve 140 of an ideal force compensator 200 is also plotted against the valve gap within the diagram. The force of the force compensator 200 related to the valve gap 240 corresponds to the stem force valve gap relationship 130, such that the force provided by the positioner drive 100 to control the valve positioner 120 can be minimized.

FIGS. 3a, 3b and 3c sketch schematically variations of valve positioner 120 with a directly mechanically coupled positioner drive 100 as well as a direct mechanically coupled force compensator 200 configured parallel and mechanically coupled to a plunger 125, which is coupled to a valve of the valve positioner 120.

In FIG. 3a, the force compensator 200 comprises a magnetic device 410, including a permanent magnet, which is mechanically coupled to the valve 126 of the valve positioner 120 for at least partially compensation of the stem force needed to shift the valve 126 of the valve positioner 120. The magnetic device 410 is magnetically coupled to a magnetic counterpart 420 with a small magnetic coupling gap to provide a magnetic force versus coupling relationship to approximate the stem force valve gap relationship 130 of the valve positioner 120. Therefore, the force compensator 200 is arranged mechanically parallel to the positioner drive 100.

FIG. 3b corresponds to FIG. 3a, but here the magnetic device 410, including a permanent magnet, is fixed and the magnetic counterpart 420 is mechanically coupled to the valve 126 of the valve positioner 120 for at least partially compensation of the stem force needed to move the valve 126 of the valve positioner 120. As described above, the magnetic device 410 is magnetically coupled to a magnetic counterpart 420 with a small magnetic coupling gap to provide a magnetic force versus magnetic gap relationship 240 to approximate the stem force versus valve gap relationship 130 of the valve positioner 120.

Choosing between the embodiments as described with FIGS. 3a and 3b can take into account the weight of the magnetic device 410 and/or the magnetic counterpart 420, in case there is a significant weight difference between the magnetic device 410 and the magnetic counterpart 420.

FIG. 3c corresponds to FIGS. 3a and 3b, but the force compensator 200 is configured to form an integral part of the positioner drive system 100, 200. This can result in a compact assembly of a positioner drive system.

FIG. 4a sketches schematically half a part of a cross section of a magnetic force compensator 200 comprising a magnetic device 410 and a magnetic counterpart 420. The structure of the magnetic device 410 and the magnetic counterpart 420 is rotationally symmetric in respect to a z-axis drawn as a dot dash line. A permanent magnet 430 of the magnetic device 410 is magnetized parallel to that z-axis and surrounded partially at two sites, not including the site of the permanent magnet 430 facing the magnetic counterpart 420, by a yoke 412. The magnetic counterpart 420 is arranged separated by a magnetic gap adjacent to the magnetic device 410, such that the magnetic device 410 and the magnetic counterpart 420 create a magnetic coupling resulting in an attracting magnetic force between the magnetic device 410 and the magnetic counterpart 420.

Such a magnetic force compensator 200 can be directly mechanically coupled to a valve of the valve positioner 120 with the magnetic device 410 or the magnetic counterpart 420, e.g. by mechanical coupling the magnetic force compensator 200 to the plunger 125 of the valve of the valve positioner 120. Either the magnetic device 410 or the magnetic counterpart 420 can be coupled to the plunger 125 of the valve.

FIG. 4b shows a diagram, which relates to the magnetic force compensator 200 of FIG. 4a, where a force F, created by the attracting magnetic force of the magnetic device 410 and the magnetic counterpart 420, is plotted against a magnetic gap distance between the magnetic device 410 and the magnetic counterpart 420.

The resulting curves 450 a, b, c correspond to different diameters, a) 4 mm; b) 3 mm; c) 2 mm, of the permanent magnet 430, where the larger diameter corresponds to the steeper form of the curve respectively. For comparison a required force F to shift a valve 126 of the valve positioner 120 into an open position relationship 460 is plotted against a valve gap x of the valve 126 of the valve positioner 120.

As shown by adapting the diameter of the permanent magnet 430 as well as by adapting other configurations of the magnetic force compensator 200, as e.g. a height of the permanent magnet, the relationship of the attracting force F of the magnetic force compensator 200 can be adapted to the required stem force to shift the valve 126 of the valve positioner 120.

FIGS. 5*a*, 5*b* and 5*c* schematically sketches further half cross sections of rotational symmetric variations, with respect to a configuration of the magnetic device 410, of the magnetic force compensator 200 with indicated magnetic flux lines within the yoke 412 and the magnetic counterpart 420 as computed by finite-element simulations.

In FIG. 5*a*, a yoke 412, as an "inner yoke," of the magnetic device 410 is formed L-shaped as a ring rotational symmetric in respect to the z-axis with the yoke 412 adjacent to the rotational symmetric permanent magnet 430 at an inner site and opposite to the magnetic counterpart 420 of the permanent magnet 430, wherein the permanent magnet 430 is also formed as a ring in respect to z-axis.

In FIG. 5*b*, a yoke 412 of the magnetic device 410 is shown, formed as an "outer yoke," partially as a disc rotational symmetric in respect to the z-axis covering the permanent magnet 430 L-shaped at a site opposite to the magnetic counterpart 420 and wherein another part of the yoke 412 is adjacent at an outside of the permanent magnet 430, which is formed as a ring in respect to the z-axis.

In FIG. 5*c*, a yoke 412 of the magnetic device 410 is shown, formed as an "inner and outer yoke," incorporating the permanent magnet 430 at three sites leaving the site adjacent to the magnetic counterpart 420 open, wherein the permanent magnet 430 is formed as a ring in respect to the z-axis.

Adaptation of the magnetic force compensator corresponding to the shown variations enables an adaption of the attracting force versus magnetic gap distance relationship 450*a, b, c* to be adapted to the required stem force versus valve gap relationship 130 to shift the valve 126 of the valve positioner 120 into a closed position.

FIGS. 6*a*, 6*b*, 6*c*, and 6*d* schematically sketch further modifications of the magnetic force compensator 200 additionally incorporating and configuring magnetic pole faces 414 for adaptation of the attracting force created by a magnetic device 410 and the magnetic counterpart 420 to the required force to shift the valve 126 of the valve positioner 120 into a closed position.

All four 2-D cross sections of the magnetic force compensators 200 are rotationally symmetric around the z-axis, and comprise axially magnetized permanent magnets 430 and provide specially shaped ferromagnetic material, for example, iron, parts called magnetic pole faces 414. The ferromagnetic pole faces 414 are directly adjacent to the permanent magnet 430 and they may be utilized to influence the magnetic force vs. magnetic gap relationship of the magnetic force compensator 200 according to a required stem force versus valve relationship 130.

FIG. 7 schematically sketches a segment of a rotational symmetric magnetic force compensator 200 with respect to a z-axis, where several permanent disc magnets 430 are inserted into the holes within the transparent drawn yoke 412 of the magnetic device 410. The drawn magnetic counterpart 420 is formed as a disc shaped ferromagnetic part 430.

FIG. 8 schematically sketches a valve positioner 120, which is directly coupled to a positional drive 100 and an adjustable magnetic force compensator 200, which is configured to be adapted by means of a distance adjustment device 810 for adjusting a magnetic gap of the adjustable magnetic force compensator 200, between the magnetic device 410 and the magnetic counterpart 420.

Advantageously, an adjustable magnetic force compensator 200 can provide for compensation of assembly and material property tolerances, which can change a relationship of a magnetic force versus magnetic gap of the magnetic force compensator 200. Using such an adjustment device 810 allows an adjustment of the magnetic gap during manufacturing of the magnetic force compensator 200.

FIG. 8 schematically sketches a simple example of such an adjustment device 810 where the magnetic device 410 is mechanically coupled to the valve 126 of the valve positioner 120. The magnetic counterpart 420 can be fixed at a housing of the valve positioner 120 including the adjustment device 810. By this the magnetic gap of the magnetic force compensator 200 can be adjusted according to a valve gap of the vale seat of the valve positioner 120.

In general, state of the art systems of valve positioners with pneumatic outputs are operated using a pilot stage, as described herein, which can be configured in different ways and are based on different technologies, as e.g. based on a piezo-nozzle or a flapper-nozzle. The usage of pilot stages in general leads to a bulky design and is cost intensive. A further problem using a pilot stage designs for valve positioners is a constant blow-off of the pneumatic medium, which results in inefficiency.

This problem can be overcome by using a positioner drive for controlling a valve positioner with pneumatic output, wherein the positioner drive is configured to be mechanically coupled to a valve of the valve positioner with pneumatic output for controlling the valve positioner with pneumatic output.

Using other words, by using such a positioner drive the valve positioner with pneumatic output, or units of a main stage of a valve positioner with pneumatic output system, is driven and/or operate directly by the positioner drive to make a pilot stage and/or a pressure reducer obsolete to save energy and/or to have a less bulky system of valve positioners with pneumatic output. That means the valve positioner with pneumatic output driven by a positioner drive can result in a reduced design space, as compared to a system of valve positioners with pneumatic output as is state-of-the-art.

This direct actuation, not using pneumatic pressure, of units of the main stage by a positioner drive can be controlled by electrical signals and/or electrical power provided to the positioner drive.

The positioner drive can be configured to be mechanically coupled directly to a plunger of the valve of the valve positioner with pneumatic output to set up a simple system using such valve positioners with pneumatic output including positioner drives, which can be electrically driven directly.

The concept of direct driving the valve positioned using a positioner drive removes a pilot stage as is state of the art, and thereby reduces the system complexity and increases robustness.

Moreover, the system becomes more controllable, since each main stage component can be controlled individually, as opposed to one pilot stage controlling a multitude of main stage elements in the state of the art.

Such a positioned drive can be based on an electromagnetic actuator, in which an input electrical power is converted to an output mechanical power, with respect to force and speed. Electromagnetic actuators represent a suitable candidate actuator technology for this application.

A positioner drive driving the valve positioner directly means that the actuator can be directly mechanically coupled to a moving part of the main stage without any mechanical transmission.

For a typical valve positioner, the valve is mechanically coupled with a plunger of the valve, which is movable arranged within the valve positioner and there results a stem force to be applied to hold the plunger of the valve at a given position, to maintain a certain valve gap opening. Using a system of positioner drives directly driving the valve positioner, this force must be provided by the positioner drive, e.g. by an actuator of the positioner drive.

The stem force can be dominated by a stiffness of flexible seals of the valve positioner, if a gap of a valve of the valve positioner is in a fairly open position. When the valve gap is small, just before the valve is closed, the stem force typically increases steeply with the remaining valve gap to drive a valve seat of the valve positioner into a sealed position. Consequently, the actuator must provide a high force at this stage.

Aspects of the present invention are related to a magnetic force compensator, a positioner drive for controlling a pneumatic positioner, a positioner drive system, a valve positioner system and a use of a magnetic force compensator with subject matter as described in the independent claims.

Advantageous modifications of the invention are stated in the dependent claims. All combinations of at least two of the features disclosed in the description, the claims, and the figures fall within the scope of the invention. In order to avoid repetition, features disclosed in accordance with the method shall also apply and be claimable in accordance with mentioned systems.

In this entire disclosure, some features are provided with counting words to improve readability or to make the assignment more clear, but this does not imply the presence of certain features.

To achieve these and other advantages and in accordance with the purpose of the invention, as embodied and broadly described herein, there is provided a magnetic force compensator for at least partially compensating a closing force required to shift a valve of a pneumatic positioner into a closed position, with a magnetic device, including a permanent magnet, and a magnetic counterpart for the magnetic device, wherein the magnetic device and the magnetic counterpart are configured to interact to create an attracting force for the at least partially compensation of the closing force; and wherein the magnetic force compensator is configured to be mechanically coupled to the valve of the pneumatic positioner.

The attracting force can be created by a magnetic coupling between the magnetic device and the magnetic counterpart.

Advantageously, the magnetic force compensator can be used instead of a mechanical spring to provide the force required to compensate the mentioned closing force, respectively a stem force, wherein the magnetic force compensator can be configured to provide the closing force, which can be just strong enough to drive the valve into sealed position, but can be configured to not be any larger, such that the force required from the actuator can be minimized.

By compensation of the closing force, respectively stem force, by using the magnetic force compensator with a valve positioner and a positioner drive a system can be provided and configured, e.g., by additional springs, wherein the valve of the valve positioner is open or closed in case of a fail operation of the positioner drive and/or in case there is no electrical power provided to the positioner drive.

Advantageously, the magnetic force compensator can be configured by the magnetic coupling between the magnetic device and the magnetic counterpart, separated by magnetic gap, to provide a force characteristic, that is similar to a relationship between the stem force and a valve gap. To compensate the stem force, the magnetic force compensator can be configured and/or arranged in parallel a positioner drive, which is configured to operate the valve positioner. Alternatively the magnetic device or the magnetic counterpart can be directly mechanically coupled to valve positioner for at least partially compensating of the stem force.

According to an aspect, the magnetic counterpart comprises a ferromagnetic material, configured to interact with the magnetic device, and/or comprises another permanent magnet, configured to interact with the magnetic device.

Advantageously, by configuring the magnetic counterpart as described above the magnetic coupling can be adapted to the stem force versus valve relationship required to shift the valve of the valve positioner.

According to an aspect, the magnetic device comprises a yoke arranged and configured to increase the attracting force and/or to adapt an attracting force versus valve-shift relationship to a closing force versus valve-shift relationship.

Advantageously by configuring and/or shaping and/or arranging the yoke of the magnetic device, the magnetic coupling relationship between the magnetic device and the magnetic counterpart can be adapted to the stem force versus valve gap relationship.

According to an aspect, the magnetic device is shaped as a circular ring. The magnetic field of the magnetic device can be oriented vertical to the shift direction of the plunger of the valve.

According to another aspect, the yoke of the magnetic device is shaped as a circular ring and/or a circular disc. Adapting the form of the yoke of the magnetic device helps to adapt the magnetic force compensator to the specific needs to compensate the stem force.

According to an aspect, the magnetic device comprises a pole face adjacent to the permanent magnet to adapt the attracting force versus valve-shift relationship to the closing force versus valve-shift relationship. Combining the magnetic device with a specific formed and arranged pole face enables to adapt the magnetic force compensator to the stem force versus valve gap relationship.

According to an aspect, the magnetic device includes a plurality of permanent magnet units magnetically coupled to the yoke. Using other words, the yoke can embed a plurality of permanent magnets, which can be distributed within the yoke evenly, particularly in respect to a rotational symmetry.

According to an aspect, the magnetic force compensator includes an adjustment device, which is configured for adjusting the magnetic coupling between the magnetic device and the magnetic counterpart to adapt the attracting force versus valve-shift relationship to the closing force versus valve-shift relationship.

Advantageously, such an adjustment device can be used to compensate for assembly and material property tolerances that occur in practice. The adjustment device can be used to modify the characteristics of the magnetic force versus magnetic relationship. A simple example of an adjustment device can be a structural arrangement or device configured to adjust the magnetic gap between the magnetic device and the magnetic counterpart, by modification of the distance between the magnetic device and/or the magnetic counterpart. This can be used to adjust the valve gap to the magnetic gap and/or the magnetic force versus magnetic gap relationship to the stem force versus valve gap relationship.

According to an aspect, the magnetic force compensator is configured, and arranged in respect to the valve of the pneumatic positioner, to lock the valve in case of fail operation of a positioner drive for controlling the pneumatic positioner; or to open the valve in case of fail operation of the positioner drive for controlling the pneumatic positioner.

The magnetic force compensator can be provided by a spring accordingly, to keep the valve open or closed, i.e. "Fail to close," or "default closed," in case of fail operation of the positioner drive and/or to provide a power off status of the positioner drive. By this there is provided a defined state at non-power to force the valve of the valve positioner to a closed and sealed position.

According to an aspect, the pneumatic positioner comprises a dielectric elastomer actuator for controlling the pneumatic positioner. Advantageously, this provides a compact design of the positioner drive and can be combined with the magnetic force compensator. To provide this, the valve positioner can include a membrane actuator, which is configured with a dielectric elastomer to control the valve positioner.

According to an aspect, the valve positioner with pneumatic output includes a first dielectric-elastomer membrane, and a second dielectric-elastomer membrane, wherein the dielectric-elastomer membranes each are mechanically coupled to the valve of the valve positioner with pneumatic output for controlling the pneumatic positioner.

According to an aspect, the membrane actuator is configured to be mechanically coupled directly to a plunger of the valve of the pneumatic positioner. This direct mechanically coupling with the plunger of the valve enables to set up a simple system using such valve positioner with pneumatic output including a positioner drive, which can be driven directly by electrical signals provided to the membrane actuator.

According to an aspect, the membrane actuator is configured to seal a pneumatic compartment of the pneumatic positioner.

According to an aspect, the membrane actuator comprises a dielectric-elastomer membrane; and at least one electrical electrode adjacent to the dielectric-elastomer membrane to control the membrane actuator based on an electrical voltage provided to the electrical electrode.

Dielectric elastomer actuators (DEA) are members of the group of "non-conventional actuators", which are based on smart materials. Advantageously dielectric elastomer actuators have a proven track record in various applications and can be adapted for the described purpose as described. The anticipated solution is to use a DEA in membrane topology, which allows for a functional integration of both pressure sealing, mechanical guiding and actuation.

DEAs include elastic membranes, as e.g. silicon, with an electrode on each side for providing an electrical field. The topology can be seen analogue to a conventional capacitor, but with an elastic dielectric material in-between the electrodes. When the electrical field is activated, electric forces compress the elastic dielectric material and thereby stretches the membrane actuator. Using the membrane actuator topology the membrane can be elongate as a result of the electric field and allow for an out of plane motion of the membrane actuator, which can drive the direct operation of a main stage valve, which is included within the pneumatic positioner.

The valve positioner having a pneumatic output or valve positioner with pneumatic output units of a main stage can be operated directly by dielectric elastomer actuators (DEA) in "membrane topology", ideally by having a functional integration of sealing and actuation by DEAs.

According to an aspect, the membrane actuator comprises an electrical counter electrode adjacent to the dielectric-elastomer membrane at the opposite side of the dielectric-elastomer membrane as the electrical electrode for generating an electrical field between the electrodes if an electrical voltage is provided to the electrodes.

According to an aspect, the membrane actuator includes: a first electrical contact electrically coupled to the electrical electrode; and a second electrical electrode with a second electrical contact; for provision of electrical voltages to operate the membrane actuator.

According to an aspect, the membrane actuator is configured to be arranged within a housing of the pneumatic positioner. Building of a pneumatic positioner, wherein the positioner drive is inside of the housing of the valve positioner with pneumatic output enables a compact design of the pneumatic positioner.

According to an aspect, the membrane actuator is configured to be mechanically coupled to a housing of the valve positioner with pneumatic output for controlling the pneumatic positioner. A peripheral part of the membrane actuator can be coupled to the housing of the valve positioner with pneumatic output for enabling the out of the plane movement of the membrane actuator to move the valve of the pneumatic positioner.

According to an aspect, the dielectric-elastomer membrane is configured to seal an inner pneumatic compartment of the valve positioner with pneumatic output against an outer environment of the valve positioner with pneumatic output in respect to a pneumatic fluid within the pneumatic compartment.

There is provided a positioner drive system for controlling a valve positioner, including an electromagnetic actuator and a magnetic force compensator, as described above, wherein the electromagnetic actuator is based on an electromagnetic Lorentz effect and/or an electromagnetic reluctance effect.

There is provided a valve positioner system, including a valve positioner and a positioner drive system, as described above, wherein the positioner drive system is mechanically coupled to a valve of the valve positioner for controlling the valve positioner.

There is proposed a use of a magnetic force compensator, which includes a magnetic device and a magnetic counterpart, as described above, for at least partially compensating a closing force, wherein the closing force is required to shift a valve of a valve positioner into a closed position.

As an embodiment of the disclosure there is provided a force compensator, which is configured to form an integral part of the positioner drive system. Thus, alternatively or additionally there is provided a positioner drive for controlling a valve positioner, which includes an electromagnetic actuator and a magnetic force compensator, as described above, wherein an actuator-yoke of the electromagnetic actuator comprises a magnetic device of the magnetic force compensator as integral part of the actuator-yoke. Additionally the positioner drive includes a magnetic counterpart of the magnetic force compensator, which is mechanically coupled to the valve of the valve positioner for controlling the valve positioner.

The magnetic device can include a permanent magnet for generation of a magnetic coupling between the magnetic device and the magnetic counterpart. This can result in a compact assembly of a positioner drive including the magnetic force compensator, but this integration of the magnetic force compensator with the positioner drive does not account for adjusting the magnetic force compensator to production tolerances, because of the integrated design.

Alternatively or additionally the positioner drive for controlling a valve positioner, can include a magnetic force compensator as described above, and an electromagnetic actuator, comprising an actuator-yoke, which is configured as magnetic counterpart for the magnetic force compensator, and wherein a magnetic device of the magnetic force compensator is coupled to the valve of the valve positioner. The magnetic device can include a permanent magnet for generation of a magnetic coupling between the magnetic device and the magnetic counterpart.

This can result in a compact assembly of a positioner drive including the magnetic force compensator, but this integration of the magnetic force compensator with the positioner drive does not account for adjusting the magnetic force compensator to production tolerances, because of the integrated design. However, the separate optimization of the different functions of the valve positioner with integrated magnetic force compensator becomes more challenging.

Using other words, by using such a positioner drive the valve positioner and/or the valve positioner system and/or the valve positioner with integrated magnetic force compensator and/or units of a main stage of the system of valve positioners with pneumatic output, is/are driven and/or operated directly by the positioner drive to make a pilot stage and/or a pressure reducer obsolete to save energy and/or to have a less bulky system of valve positioners with pneumatic output. That means the valve positioner with pneumatic output can be designed to have a reduced design space, as compared to systems of valve positioners with pneumatic output as is state-of-the-art.

This direct actuation by a positioner drive, not using pneumatic pressure to operate units of the main stage, can be controlled by electrical signals and/or electrical power provided to the positioner drive.

Advantageously, the valve positioner, which is mechanically coupled to a positioner drive can provide a robust system, because it can be built by a less complex mechanical construction. In addition, such a valve positioner with pneumatic output can be configured to be more robust towards temperature changes and external vibrations than a pneumatic pilot stage and by this it can be adapted to a plurality of production environments. To drive the valve positioner with pneumatic output directly reduces the requirements in respect to a quality of the air of the overall pneumatic system, because it is less sensitive to particles distributed by the air, which may get stuck within, e.g., a pneumatic pilot stage.

A separate operation of the individual valves of the system of valve positioners with pneumatic output by the corresponding positioner drives can improve the performance of the system of valve positioners with pneumatic output. Because there is no steady state air flow necessary for a pilot stage this steady-state air consumption is eliminated.

A use of a positioner drive with integrated magnetic force compensator as described above is proposed, to control a valve positioner with pneumatic output and/or a system of valve positioners with pneumatic output and/or a pneumatic actuator for controlling a process valve.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A valve positioner system for a valve shiftably disposed in a valve positioner between an open position and a closed position, the valve positioner system at least partially compensating a closing force required to shift the valve into the closed position, the valve positioner system comprising:
   a valve positioner drive system configured to create a drive force that is adapted to urge the valve toward the closed position; and
   a magnetic force compensator configured to create a compensating force that is adapted to urge the valve toward the closed position, the magnetic force compensator including:
      a magnetic device, the magnetic device comprising a permanent magnet; and
      a magnetic counterpart;
      wherein the magnetic device and the magnetic counterpart are configured to interact to create the compensating force; and
   wherein each of the valve positioner drive system and the magnetic force compensator is adapted to be directly mechanically coupled to a same end of the valve such that the drive force and the compensating force extend in parallel and together provide the closing force.

2. The valve positioner system according to claim 1, wherein the magnetic counterpart comprises a ferromagnetic material configured to interact with the magnetic device.

3. The valve positioner system according to claim 1, wherein the magnetic counterpart comprises another permanent magnet configured to interact with the magnetic device.

4. The valve positioner system according to claim 1, wherein the magnetic device comprises a yoke arranged and configured to increase the compensating force and/or to adapt a compensating force versus valve-shift relationship to a closing force versus valve-shift relationship.

5. The valve positioner system according to claim 4, wherein the magnetic device comprises a plurality of permanent magnet units magnetically coupled to the yoke.

6. The valve positioner system according to claim 4, wherein the yoke of the magnetic device is shaped as a circular ring and/or a circular disc.

7. The valve positioner system according to claim 1, wherein the magnetic device comprises a pole face adjacent to the permanent magnet to adapt a compensating force versus valve-shift relationship to a closing force versus valve-shift relationship.

8. The valve positioner system according to claim 1, wherein the magnetic device is shaped as a circular ring.

9. The valve positioner system according to claim 1, further comprising an adjustment device configured to adjust the magnetic coupling between the magnetic device and the magnetic counterpart to adapt a compensating force versus valve-shift relationship to a closing force versus valve-shift relationship.

10. The valve positioner system according to claim 1, wherein the magnetic force compensator is configured and arranged with respect to the valve of the valve positioner to lock the valve in case of fail operation of the positioner drive for controlling the valve positioner; or to open the valve in case of fail operation of the positioner drive for controlling the valve positioner.

11. The valve positioner system according to claim 1, wherein the valve positioner comprises a dielectric elastomer actuator for controlling the valve positioner.

12. The valve positioner system according to claim 1, wherein the magnetic device and the magnetic counterpart are configured to interact to create the compensating force such that it increases steeply as the valve approaches the closed position.

13. The valve positioner system according to claim 12, wherein the valve positioner further comprises a valve seat for the valve, wherein the valve and the valve seat are driven into a sealed position as the valve shifts into the closed position such that the closing force increases steeply,
wherein the magnetic device and the magnetic counterpart are configured and/or adapted to interact to create the steeply increasing compensating force similar to the steeply increasing closing force.

14. The valve positioner system according to claim 1, wherein each of the valve positioner drive system and the magnetic force compensator is further adapted to be directly mechanically coupled to parallel positions to one another on the same end of the valve to together provide the closing force.

15. A positioner drive system for controlling a valve shiftably disposed in a valve positioner between an open position and a closed position, the valve positioner drive system at least partially compensating a closing force required to shift the valve into the closed position, the valve positioner drive system comprising:
an electromagnetic actuator configured to create a drive force that is adapted to urge the valve toward the closed position; and
a magnetic force compensator configured to create a compensating force that is adapted to urge the valve toward the closed position, the magnetic force compensator including:
a magnetic device, the magnetic device comprising a permanent magnet; and
a magnetic counterpart;
wherein the magnetic device and the magnetic counterpart are configured to interact to create the compensating force;
wherein each of the electromagnetic actuator and the magnetic force compensator is adapted to be directly mechanically coupled to a same end of the valve such that the drive force and the compensating force extend in parallel and together provide the closing force; and
wherein the electromagnetic actuator is based on an electromagnetic Lorentz effect and/or an electromagnetic reluctance effect.

16. A valve positioner system for a valve shiftably disposed in a valve positioner between an open position and a closed position, the valve positioner system at least partially compensating a closing force required to shift the valve into the closed position, the valve positioner system comprising:
the valve positioner; and
a positioner drive system for controlling the valve positioner, the valve positioner associated with a valve, the positioner drive system including:
an electromagnetic actuator associated with the valve positioner and the valve, configured to create a drive force that is adapted to urge the valve toward the closed position;
a magnetic force compensator configured to create a compensating force that is adapted to urge the valve toward the closed position, the magnetic force compensator including:
a magnetic device, the magnetic device comprising a permanent magnet; and
a magnetic counterpart;
wherein the magnetic device and the magnetic counterpart are configured to interact to create the compensating force; and
wherein each of the electromagnetic actuator and the magnetic force compensator is adapted to be directly mechanically coupled to a same end of the valve such that the drive force and the compensating force extend in parallel and together provide the closing force.

* * * * *